US008802980B2

(12) United States Patent
Shivell et al.

(10) Patent No.: US 8,802,980 B2
(45) Date of Patent: Aug. 12, 2014

(54) MOUNTING PLATE HAVING FACEPLATE GROUNDING MEANS

(75) Inventors: William Taylor Shivell, Breinigsville, PA (US); James P. Steiner, Royersford, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 238 days.

(21) Appl. No.: 13/491,843

(22) Filed: Jun. 8, 2012

(65) Prior Publication Data

US 2012/0312576 A1    Dec. 13, 2012

Related U.S. Application Data

(60) Provisional application No. 61/495,692, filed on Jun. 10, 2011.

(51) Int. Cl.
*H02G 3/14*    (2006.01)

(52) U.S. Cl.
USPC .......................................................... 174/55

(58) Field of Classification Search
CPC ......................................................... H02G 3/14
USPC ............................................................ 174/55
See application file for complete search history.

Primary Examiner — Timothy Thompson
Assistant Examiner — Charles Pizzuto
(74) Attorney, Agent, or Firm — Condo Roccia Koptiw LLP

(57) ABSTRACT

A mounting plate for a control device is adapted to be coupled to an electrical wallbox and is made of a non-conductive material. The mounting plate comprises at least one faceplate screw opening for receiving a faceplate screw such that a faceplate may be coupled to the mounting plate during installation. The mounting plate further comprises a ground wire. The ground wire is adapted to be coupled to earth ground and is also positioned to overlap a portion of the faceplate screw opening. During the installation of the faceplate, as the faceplate screw is inserted into the faceplate screw opening of the yoke, the faceplate screw contacts the ground wire as well as the faceplate. In the event that the faceplate is made of metal, the faceplate will be coupled to the ground wire, and thus, safely grounded.

14 Claims, 5 Drawing Sheets

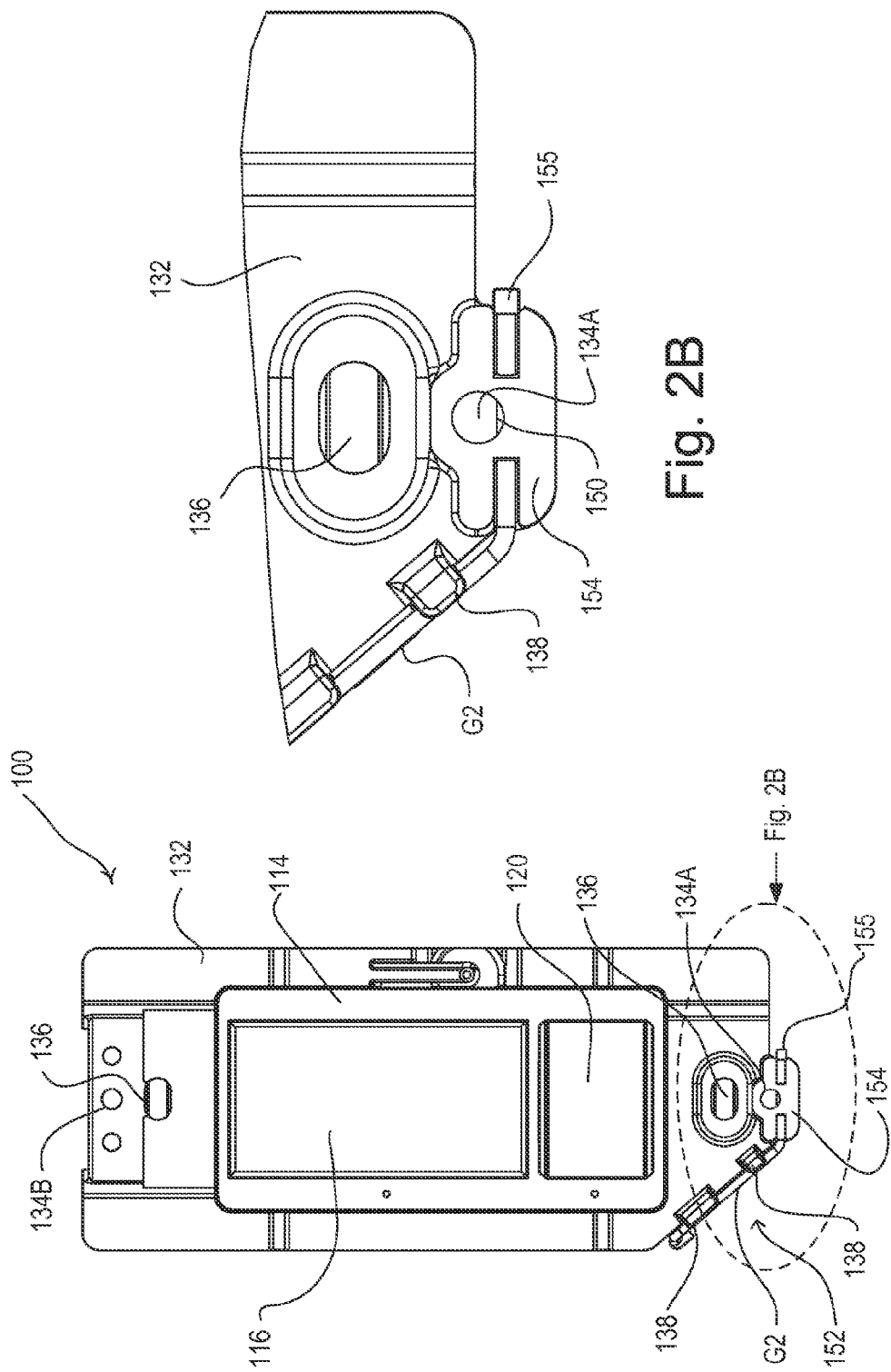

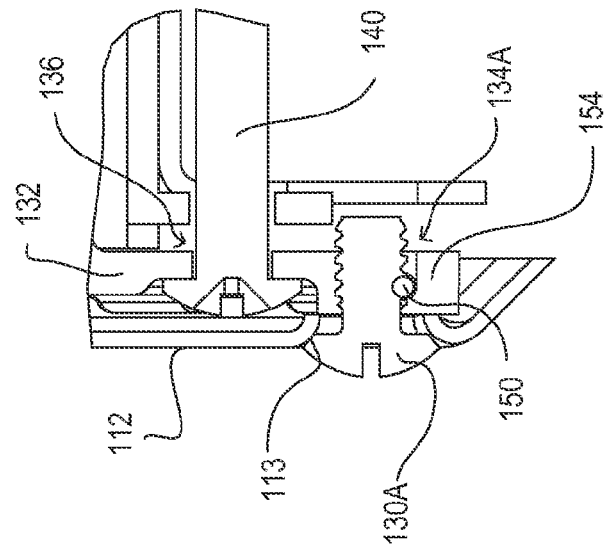
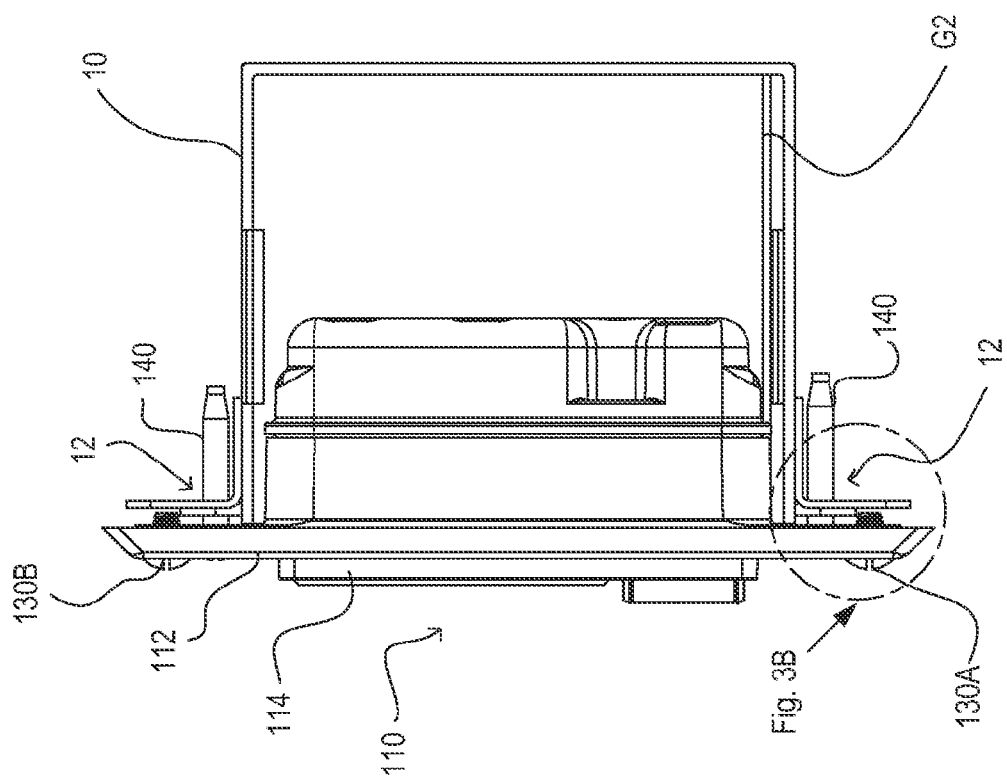

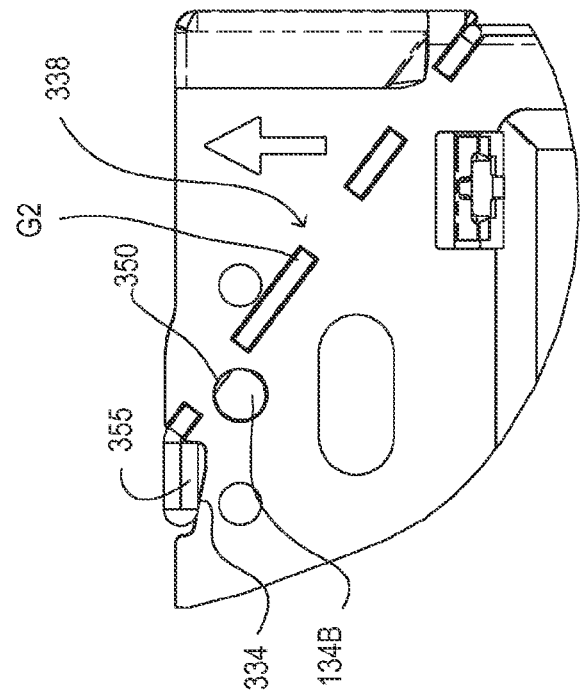
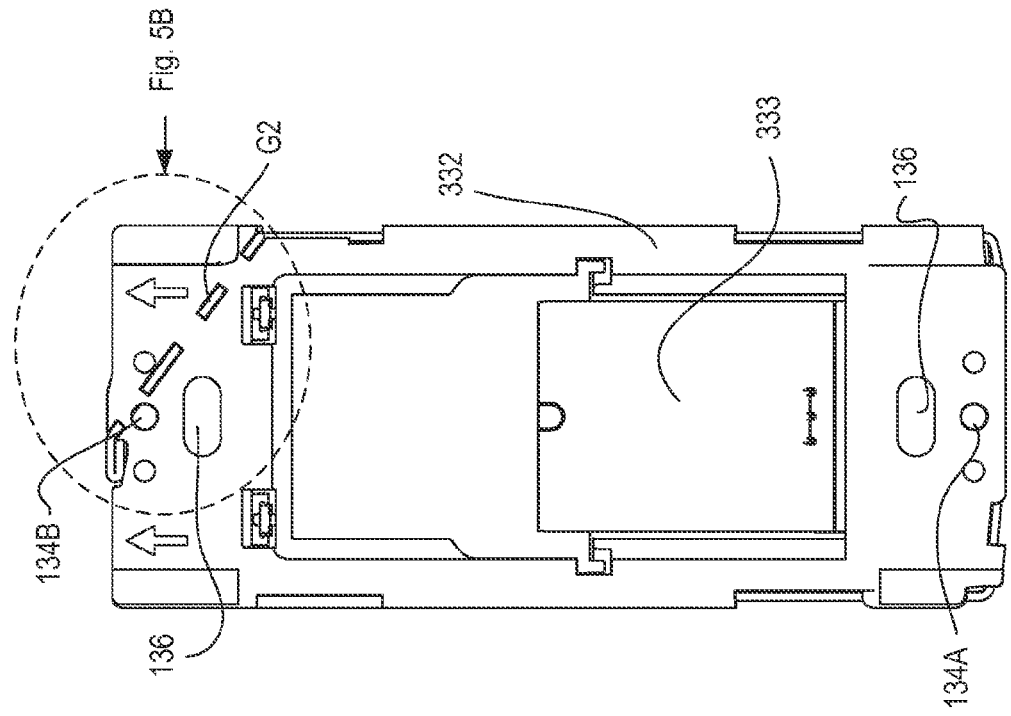

MOUNTING PLATE HAVING FACEPLATE GROUNDING MEANS

CROSS REFERENCES TO RELATED APPLICATIONS

This application is a non-provisional application of commonly-assigned U.S. Provisional Application No. 61/495,692, filed Jun. 10, 2011, entitled LOAD CONTROL DEVICE HAVING FACEPLATE GROUNDING MEANS, the entire disclosure of which is hereby incorporated by reference.

BACKGROUND OF THE INVENTION

1. Field of the Invention

The present invention relates to wall-mounted load control devices for control of the power delivered from an alternating-current (AC) power source to an electrical load, and more particularly, to a mounting plate for a load control device having a means for grounding a metal faceplate.

2. Description of the Related Art

Typical load control devices are operable to control the amount of power delivered to an electrical load, such as a lighting load or a motor load, from an alternating-current (AC) power source. Wall-mounted load control devices are adapted to be mounted to standard electrical wallboxes. A dimmer switch comprises a controllably conductive device (e.g., a bidirectional semiconductor switch, such as, a triac), which is coupled in series between the power source and the load. The controllably conductive device is controlled to be conductive and non-conductive for portions of a half-cycle of the AC power source to thus control the amount of power delivered to the load (e.g., using a phase-control dimming technique). A "smart" dimmer switch (i.e., a digital dimmer switch) comprises a microprocessor (or similar controller) for controlling the semiconductor switch and a power supply for powering the microprocessor.

An electronic switch (i.e., a digital switch) comprises a controllably conductive device (such as a relay or a bidirectional semiconductor switch), a microprocessor, and a power supply. In contrast to a smart dimmer switch, the controllably conductive device of an electronic switch is not controlled using the phase-controlled dimming technique to variably adjust the intensity of a lighting load, but is controlled to be either conductive or non-conductive during each half-cycle of the AC power source to simply toggle the electrical load on and off. Digital dimmers and switches may further comprise occupancy detection circuits such that the dimmers and switches are able to operate as occupancy sensors to automatically turn on lighting loads in response to the presence of an occupant (i.e., an occupancy condition) and automatically turn off the lighting loads in response to detecting the absence of an occupant (i.e., a vacancy condition).

Such wall-mounted load control devices are typically installed with a faceplate. In the event that the faceplate is made of a conductive material (i.e., metal), the faceplate must be coupled to earth ground to comply with national electrical regulations. A prior art load control device typically comprises a yoke (or mounting plate) that is designed to be coupled to both the electrical wallbox and the faceplate. Typically, the yoke of such a prior art load control device is made of metal and further comprises a ground wire—coupled to the yoke—such that the metal yoke may be coupled to earth ground.

When such a prior art load control device is installed with a metal faceplate, the faceplate is coupled to earth ground because the faceplate contacts the metal yoke (either directly or through a faceplate screw, and the yoke is coupled to earth ground via the ground wire. Thus, because the faceplate (being made of metal) is electrically as well as mechanically coupled to the grounded metal yoke, national electrical regulations are properly satisfied.

However, metal yokes can be quite costly. Therefore, there exists a need for a load control device having a low cost grounding means for a metal faceplate—particularly, when the load control device comprises a yoke made of a non-conductive material.

SUMMARY OF THE INVENTION

According to an embodiment of the present invention, a mounting plate system is operable to couple a control device (e.g., a load control device, a remote control device, etc) to an electrical wallbox and a faceplate. The mounting plate system includes a mounting plate comprising at least one faceplate screw opening. The mounting plate operable to be coupled to the electrical wallbox. The mounting plate system also includes a ground wire coupled to the mounting plate. The ground wire is positioned relative to the faceplate screw opening such that the ground wire is adapted to contact a faceplate screw when a faceplate screw is received through the faceplate screw opening.

According to another embodiment of the present invention, a wall-mountable load control device is adapted to be coupled between an AC power source and an electrical load for controlling the power delivered to the load. The load control device comprises a non-conductive yoke for mounting the load control device into a standard electrical wallbox. The yoke has at least one faceplate screw opening. The load control device also comprises a metal conductor attached to the yoke, and the metal conductor is operable to be coupled to earth ground. The faceplate screw opening overlaps a portion of the metal conductor such that the metal conductor is adapted to contact a faceplate screw when the faceplate screw is received through the faceplate screw opening.

According to another embodiment of the present invention, an adapter plate system is operable to couple a control device to an electrical wallbox and a faceplate. The adapter plate system comprises an adapter plate operable to be coupled to a control device and operable to be coupled to the electrical wallbox. The adapter plate comprises at least one faceplate screw opening. The adapter plate system comprises a ground wire coupled to the adapter plate. The ground wire is positioned relative to the faceplate screw opening such that a section of the ground wire partially overlaps the faceplate screw opening. Thus when a faceplate screw is received through the faceplate screw opening, the ground wire is adapted to contact the faceplate screw.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 2A is a front view of the electronic switch of FIG. 1 in an uninstalled configuration;

FIG. 2B is an enlarged view of a lower portion of the front view of the electronic switch of FIG. 1;

FIG. 3A is a side view of the electronic switch of FIG. 1;

FIG. 3B is an enlarged view of a lower portion of the side view of the electronic switch of FIG. 1;

FIG. 5A is a front view of a mounting plate according the second embodiment of the invention; and FIG. 5B is an enlarged view of an upper portion of the front view of the mounting plate of FIG. 5A.

DETAILED DESCRIPTION OF THE INVENTION

Figure 1:
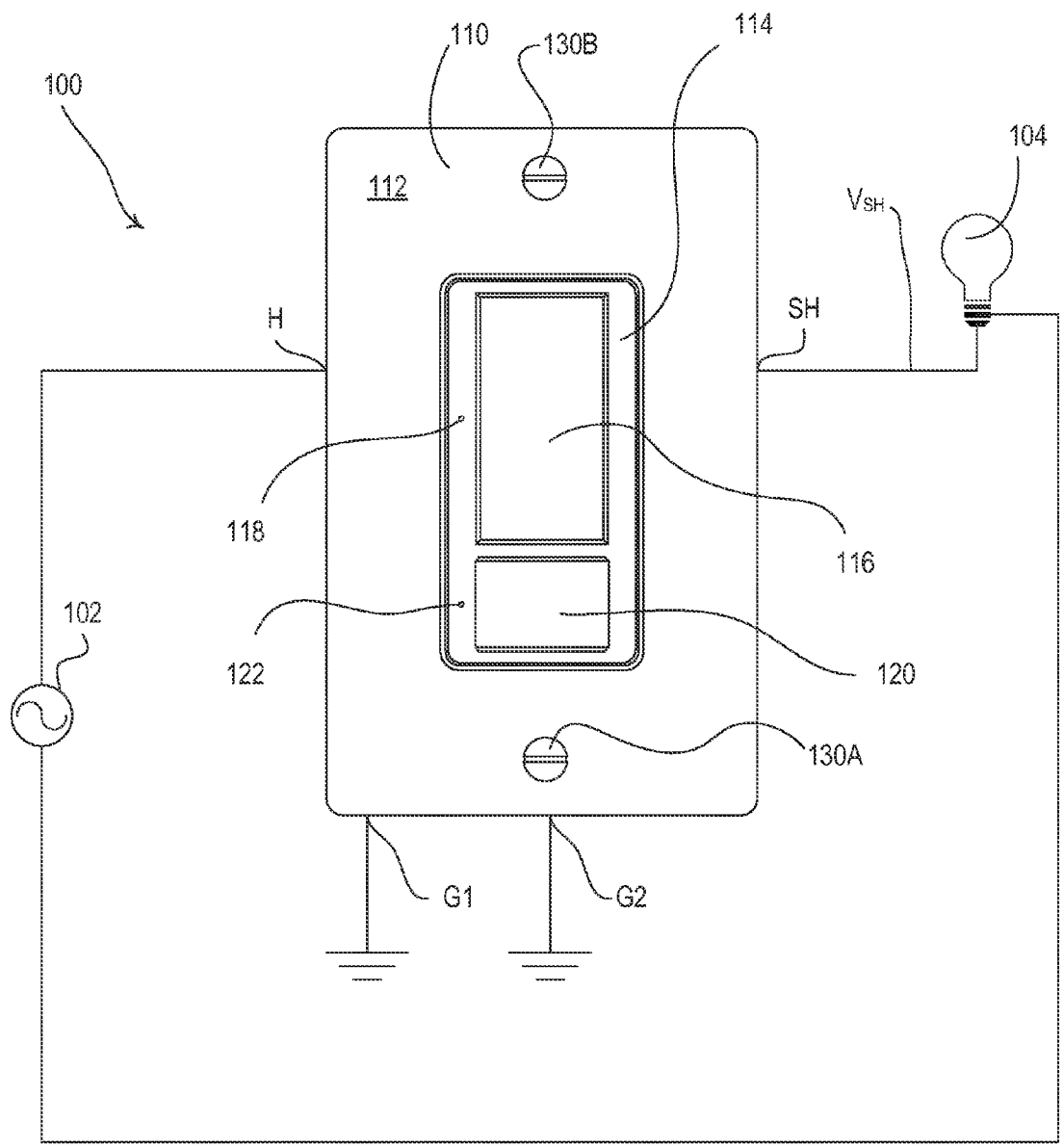
FIG. 1 is a simplified diagram of a lighting control system including an electronic switch.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 100 including an electronic switch 110 according to a first embodiment of the present invention. The electronic switch 110 comprises a hot terminal H and a switched hot terminal SH and is adapted to be coupled in series electrical connection between an alternating current (AC) power source 102 (e.g., 120 $V_{AC}$ @ 60 Hz or 240 $V_{AC}$ @ 50 Hz) and a lighting load 104 for controlling the power delivered to the lighting load. The electronic switch 110 generates a switched hot voltage $V_{SH}$ at the switched hot terminal SH, which is coupled to the lighting load 104 for turning the load on and off.

The electronic switch 110 is adapted to be wall-mounted in a standard electrical wallbox 10 (FIG. 3A). The electronic switch 110 comprises a faceplate 112 and a bezel 114 received in an opening of the faceplate. The electronic switch 110 further comprises a control actuator 116 (i.e., a control button) that may be actuated by a user for toggling (i.e., turning off and on) the lighting load 104, and a load visual indicator 118 for providing feedback of whether the lighting load is on or off. The electronic switch 110 further comprises two ground conductors G1 and G2 that are both adapted to be coupled to earth ground. In particular, the ground conductor G1 is electrically coupled to a printed circuit board (not shown) of the electronic switch 110 and may provide a path for conducting a leakage current for powering the low voltage circuitry of the electronic switch. The ground conductor G2 (e.g., a ground wire) is adapted to be coupled to the faceplate 112 as will be described in greater detail below. According to an alternative embodiment, ground wire G1 may not be included in the electronic switch 110 and the power supply may charge through the lighting load 104.

The electronic switch 110 also operates as an occupancy sensor to turn on the lighting load 104 in response to the presence of an occupant in the vicinity of the electronic switch (i.e., an occupancy condition), and to turn off the lighting load in response to the absence of the occupant (i.e., a vacancy condition). The electronic switch 110 comprises a lens 120 for directing the infrared energy from the occupant to an internal detector of an occupancy detection circuit (not shown), such that the electronic switch is operable to detect the occupancy and vacancy conditions. The electronic switch 110 further comprises an occupancy visual indicator 122 that is illuminated when the electronic switch has detected an occupancy condition in the space. Alternatively, the occupancy visual indicator 122 could be located behind the lens 120 such that the lens is operable to illuminate when the electronic switch 110 has detected an occupancy condition.

Alternatively, the electronic switch 110 could operate as a vacancy sensor. When operating as a vacancy sensor, the electronic switch 110 would only operate to turn off the lighting load 104 in response to detecting a vacancy condition in the space. The electronic switch 110 would not turn on the lighting load 104 in response to detecting an occupancy condition. Therefore, when the electronic switch operates as a vacancy sensor, the lighting load 104 must be turned on manually (e.g., in response to a manual actuation of the control actuator 116). Examples of occupancy and vacancy sensors are described in greater detail in U.S. patent application Ser. No. 12/203,500, filed Sep. 3, 2008, entitled BATTERY-POWERED OCCUPANCY SENSOR, the entire disclosure of which is hereby incorporated by reference.

FIG. 2A is a front view of the electronic switch 110 in an uninstalled configuration, and FIG. 2B is an enlarged view of the lower portion of the electronic switch encircled in a dashed line on FIG. 2A. In particular, FIGS. 2A and 2B depict the electronic switch 110 without the faceplate 112. FIG. 3A is a side view of the electronic switch as installed in the electrical wallbox 10 with the faceplate 112. To simplify the side view of the electronic switch 110 in FIG. 3A, the terminals H, SH, and G1 are not shown. FIG. 3B is an enlarged side cross-sectional view taken through the center of the electronic switch 110 of the lower portion of the switch encircled in a dashed line on FIG. 3A.

The electronic switch 110 comprises a yoke 132 which further comprises two mounting screw openings 136 for receiving mounting screws 140 such that the electronic switch may be mounted to the electrical wallbox 10. The yoke 132 of the electronic switch 110 is constructed of a non-conductive, low-cost material (e.g., plastic). The yoke 132 further comprises a coupling tab 154 and clips 138 which mechanically couple the ground wire G2 to the yoke. A first end of the ground wire G2 is adapted to be coupled to earth ground and a second end of the ground wire G2 includes a cap 155 (e.g., a ferrule or crimp). The ground wire G2 extends through the coupling tab 154 and is received by (attached to) the clips 138 along an angled edge 152 of the yoke 132. The cap 155 of the ground wire G2 acts as a mechanical stop and is sized appropriately such that the ground wire G2 does not detach from the electronic switch 110 when pulled on the first end of the ground wire. In addition, the clips 138 along the angled edge 152 act to guide the first end of the ground wire G2 directly into the electrical wallbox 10.

The yoke 132 further comprises faceplate screw openings 134A, 134B for receiving respective metal faceplate screws 130A, 130B such that the faceplate 112 can be mounted to the electronic switch 110. In particular, faceplate screw opening 134A is formed in the coupling tab 154. The faceplate screw opening 134A is positioned such that a section 150 of the ground wire G2 slightly overlaps a portion of the screw opening as shown in FIG. 2B.

During installation, the terminals H and SH are electrically coupled to the AC power source 102 and the load 104, respectively, and the conductors G1, and G2 are electrically coupled to earth ground in the electrical wallbox 10. Then, mounting screws 140 are inserted through the mounting screw openings 136 of the electronic switch 110 and through wallbox screw openings 12 of the electrical wallbox 10 to mechanically couple the electronic switch to the wallbox. Then, the faceplate 112 is installed by inserting faceplate screws 130A, 130B through two respective faceplate openings 113 of the faceplate and through faceplate screw openings 134A and 134B of the electronic switch 110 to mechanically couple the faceplate to the electronic switch. As the faceplate screw 130A is screwed into faceplate screw opening 134A, the faceplate screw 130A contacts the section 150 of the ground wire G2 as shown in FIG. 3B. Because the ground wire G2 is electrically coupled to earth ground in the electrical wallbox 10, the faceplate screw 130A (being made of metal) is also electrically coupled to earth ground because the screw contacts the section 150 of the ground wire. Further, the faceplate screws 130A, 130B directly contact the faceplate 112 when the faceplate is fully installed. Thus, in the event that the faceplate 112 is made of metal, the faceplate is also coupled to earth ground through the faceplate screw 130A thus complying with the aforementioned national electrical regulations.

Figure 4:
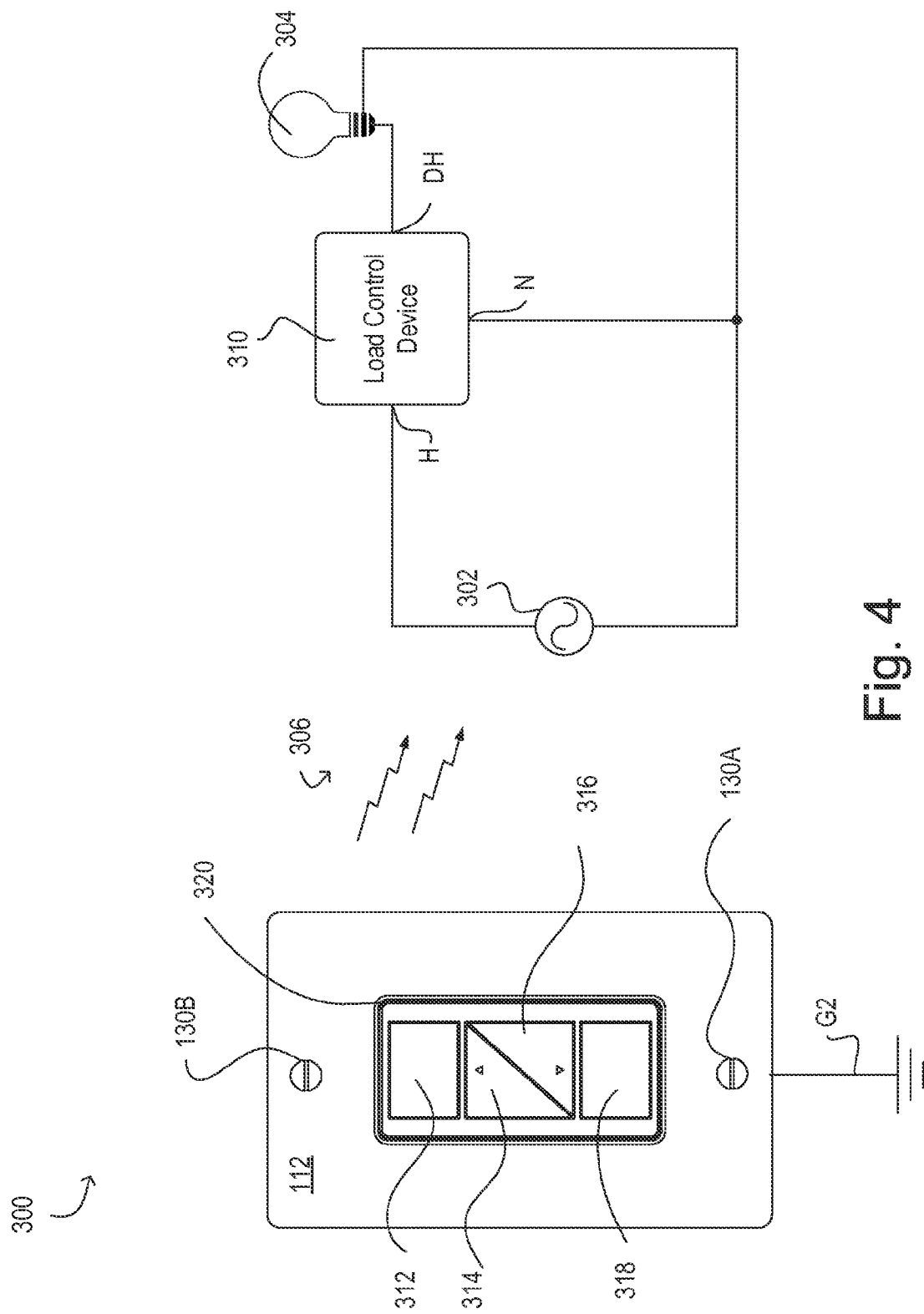
FIG. 4 is a simplified diagram of a lighting control system according to a second embodiment of the invention.

FIG. 4 is a simplified block diagram of a wireless lighting control system 300 according to a second embodiment of the present invention. The lighting control system 300 comprises a remotely-controllable load control device 310 (e.g., a dimming module) and a remote control 320. The load control device 310 is coupled in series electrical connection between an AC power source 302 and an electrical lighting load 304 via a hot terminal H and a dimmed hot terminal DH, respectively, for controlling the amount of power delivered to the lighting load. The load control device 310 may be a wall-mounted device similar to the electronic switch 110 of the first embodiment, or may be mounted remotely (e.g., within a junction box, electrical closet, etc). Alternatively, the load control device 310 may comprise another type of remotely-controllable load control device, for example, a remotely-controllable electronic dimming ballast, a remotely-controllable driver for a light-emitting diode (LED) light source, a dimmer circuit for other types of lighting loads (such as, magnetic low-voltage lighting loads, electronic low-voltage lighting loads, and screw-in compact fluorescent lamps), a controllable plug-in module adapted to be plugged into an electrical receptacle, a controllable screw-in module adapted to be screwed into the electrical socket (e.g., an Edison socket) of a lamp, a motor control device, a motorized window treatment (such as, a roller shade or a drapery), a temperature control device, or an audio/visual control device.

The load control device 310 is operable to receive wireless transmissions via radio frequency (RF) signals 306 from the remote control 320. The remote control 320 is a battery-powered device and comprises a plurality of actuators (i.e., an on button 312, an off button 318, a raise button 314, and a lower button 316). The remote control 320 transmits packets (i.e., messages) via the RF signals 306 (i.e., wireless transmissions) to the load control device 310 in response to actuations of any of the actuators to control the lighting load 304 accordingly.

The remote control 320 of the lighting control system 300 is further adapted to be wall-mounted in a standard electrical wallbox via an adapter plate 332 (FIG. 5A). The adapter plate 332 comprises a flexible leaf portion 333 that is operable to be slidingly received by the rear surface (not shown) of the remote control 320. Thus, the remote control 320 can be mechanically coupled to the adapter plate 332, and the adapter plate can further be coupled to a standard electrical wallbox via mounting screws 140 as will be described in further detail below. Additional details of adapter and/or mounting plates for remote control devices are described in commonly-assigned U.S. patent application Ser. No. 12/772,502, filed May 3, 2012, entitled STRUCTURE FOR MOUNTING A WIRELESS BATTERY-POWERED REMOTE CONTROL, the entire disclosure of which is hereby incorporated by reference.

FIG. 5A is a front view of the adapter plate 332 without the remote control 320 and faceplate 112 coupled thereto, and FIG. 5B is an enlarged view of the upper portion of the adapter plate encircled in a dashed line on FIG. 5A. The adapter plate 332 shares similar features of the yoke 132 of the first embodiment. Both the adapter plate 332 and the yoke 132 comprise mounting screw openings 136 for receiving mounting screws 140 such that both the adapter plate and the yoke may be coupled to the electrical wallbox 10. Further, both the adapter plate 332 and the yoke 132 comprise faceplate screw openings 134A, 134B for receiving respective metal faceplate screws 130A, 130B such that the faceplate 112 can be mounted to the adapter plate and yoke, respectively. The remote control device 320 is battery-powered, and is not coupled to the AC power source 302. However, because the remote control 320 is adapted to be coupled to the electrical wallbox 10 via the adapter plate 332, it is advantageous to also provide a means for grounding the faceplate 112. Thus, the adapter plate 332 further comprises the ground wire G2 that is adapted to be coupled to earth ground and to the faceplate 112 in essentially the same manner as the ground wire G2 is coupled to the faceplate of the first embodiment.

The adapter plate 332 comprises a channel 338 that allow the ground wire G2 to be inserted through the adapter plate. According to the second embodiment of the invention, an end portion 355 of the ground wire G2 is folded onto itself and soldered to an adjacent portion of the ground wire G2 such that the end portion 355 forms a mechanical stop to prevent the ground wire G2 from being de-coupled from (i.e., pulled through the channel 338 of) the adapter plate 332. The folded end portion 355 fits within a pocket 334 of the adapter plate 332. Similar to the first embodiment, the ground wire G2 is positioned relative to the faceplate screw opening 134B such that a section 350 of the ground wire slightly overlaps a portion of the screw opening. The section 350 of the second embodiment is operable to contact the faceplate screw 130B in the same manner that the section 150 of the ground wire G2 contacts faceplate screw 130A as shown in FIG. 3B. Additionally, the specific ground wire G2 coupling means shown in FIG. 5B could be used for the electronic switch 110 of the first embodiment, and similarly, the ground wire coupling means shown in FIG. 2B could be used for the adapter plate 332.

While the present invention has been described with reference to the electronic switch 110 controlling the power delivered to a connected lighting load, the concepts of the present invention could be used in any type of wall-mounted control device of a load control system, such as, for example, a dimmer switch for adjusting the intensity of a lighting load (such as an incandescent lamp, a magnetic low-voltage lighting load, an electronic low-voltage lighting load, and a screw-in compact fluorescent lamp), a remote control, a keypad device, a visual display device, a temperature control device, and an audio/visual control device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mounting plate system operable to couple a control device to an electrical wallbox and a faceplate, the mounting plate system comprising:
   a mounting plate comprising at least one faceplate screw opening, the mounting plate operable to be coupled to the electrical wallbox; and
   a ground wire coupled to the mounting plate;

wherein the ground wire is positioned relative to the faceplate screw opening such that the ground wire is adapted to contact a faceplate screw when a faceplate screw is received through the faceplate screw opening.

2. The mounting plate system of claim 1, wherein the mounting plate is made of a non-conductive material.

3. The mounting plate system of claim 1, wherein the ground wire comprises:
   a first end operable to be coupled to earth ground;
   a second end opposite the first end; and
   a section between the first and second ends,
wherein the section of the ground wire partially overlaps the faceplate screw opening such that the ground wire is adapted to contact a faceplate screw when the faceplate screw is received through the faceplate screw opening.

4. The mounting plate system of claim 3, wherein the second end of the ground wire comprises a ferrule, wherein the ferrule helps to couple the ground wire to the mounting plate.

5. The mounting plate system of claim 3, wherein the second end of the ground wire comprises a folded end, wherein the folded end helps to couple the ground wire to the mounting plate.

6. The mounting plate system of claim 3, wherein the second end of the ground wire comprises a crimp, wherein the crimp helps to couple the ground wire to the mounting plate.

7. The mounting plate system of claim 3, wherein the mounting plate comprises a channel for receiving the ground wire and for coupling the ground wire to the mounting plate.

8. A wall-mountable load control device adapted to be coupled between an AC power source and an electrical load for controlling the power delivered to the load, the load control device comprising:
   a non-conductive yoke for mounting the load control device into a standard electrical wallbox, the yoke comprising at least one faceplate screw opening; and
   a metal conductor attached to the yoke, the metal conductor operable to be coupled to earth ground;
   wherein the faceplate screw opening overlaps a portion of the metal conductor such that the metal conductor is adapted to contact a faceplate screw when the faceplate screw is received through the faceplate screw opening.

9. The wall-mountable load control device of claim 8, wherein the metal conductor comprises a ground wire having a first and a second end.

10. The wall-mountable load control device of claim 9, wherein the second end of the ground wire comprises a ferrule, wherein the ferrule helps to couple the ground wire to the yoke.

11. The wall-mountable load control device of claim 9, wherein the second end of the ground wire comprises a folded end, wherein the folded end helps to couple the ground wire to the yoke.

12. The wall-mountable load control device of claim 9, wherein the second end of the ground wire comprises a crimp, wherein the crimp helps to couple the ground wire to the yoke.

13. The wall-mountable load control device of claim 9, wherein the yoke comprises a channel for receiving the ground wire and for coupling the ground wire to the yoke.

14. An adapter plate system operable to couple a control device to an electrical wallbox and a faceplate, the adapter plate system comprising
   an adapter plate operable to be coupled to a control device and operable to be coupled to the electrical wallbox, the adapter plate comprising at least one faceplate screw opening; and
   a ground wire coupled to the adapter plate;
wherein the ground wire is positioned relative to the faceplate screw opening such that a section of the ground wire partially overlaps the faceplate screw opening such that when a faceplate screw is received through the faceplate screw opening, the ground wire is adapted to contact the faceplate screw.

\* \* \* \* \*